(12) United States Patent
Bhargava

(10) Patent No.: US 10,935,005 B2
(45) Date of Patent: Mar. 2, 2021

(54) GRAVITATIONAL POTENTIAL ENERGY STORAGE SYSTEM

(71) Applicant: Ayesha Bhargava, Austin, TX (US)

(72) Inventor: Ayesha Bhargava, Austin, TX (US)

(*) Notice: Subject to any disclaimer, the term of this patent is extended or adjusted under 35 U.S.C. 154(b) by 0 days.

(21) Appl. No.: 16/592,741

(22) Filed: Oct. 3, 2019

(65) Prior Publication Data

US 2020/0109703 A1  Apr. 9, 2020

Related U.S. Application Data

(60) Provisional application No. 62/741,543, filed on Oct. 5, 2018.

(51) Int. Cl.
| | | |
|---|---|---|
| *F03G 3/00* | (2006.01) | |
| *H02K 7/18* | (2006.01) | |
| *H02K 7/116* | (2006.01) | |

(52) U.S. Cl.
CPC .............. *F03G 3/00* (2013.01); *H02K 7/116* (2013.01); *H02K 7/1853* (2013.01)

(58) Field of Classification Search
CPC ...................................... F03G 3/00; F03G 7/10
See application file for complete search history.

(56) References Cited

U.S. PATENT DOCUMENTS

| | | | | |
|---|---|---|---|---|
| 5,889,336 A | * | 3/1999 | Tateishi ............... | F03B 13/1865 290/43 |
| 6,803,670 B2 | * | 10/2004 | Peloquin ............... | F03B 17/025 290/42 |
| 2011/0241356 A1 | * | 10/2011 | Khoshnevis ............. | H02P 9/04 290/1 R |
| 2016/0003224 A1 | * | 1/2016 | McGrath .................. | F03D 9/16 185/32 |
| 2016/0084236 A1 | * | 3/2016 | Kellinger ................. | F03G 3/00 60/495 |
| 2017/0077467 A1 | * | 3/2017 | Kronke ............... | H01M 10/663 |

FOREIGN PATENT DOCUMENTS

| | | | | | |
|---|---|---|---|---|---|
| DE | 4135440 A1 | * | 4/1993 | ............... | F03G 3/08 |
| GB | 2506133 A | * | 3/2014 | ............... | F03G 3/00 |

* cited by examiner

*Primary Examiner* — Phillip A Johnson

(57) ABSTRACT

Systems and methods are disclosed for using electrical energy to store potential energy during a first period of electrical demand and, thereafter, to convert the stored potential energy into electrical energy that can be supplied to an electrical grid during a second period of electrical demand. During the first period of electrical demand, electrical energy is used to move one or more weight(s) from a first relative position of low potential energy to a second relative position of high potential energy. During time periods of high electrical demand, the system is used to move one or more individual weight(s) from the relative position of high potential energy to the relative position of low potential energy. As each individual weight moves from the position of high potential energy, the motion of the weight is used to cause a generator to generate electrical energy.

11 Claims, 13 Drawing Sheets

GRAVITATIONAL POTENTIAL ENERGY STORAGE SYSTEM

FIELD OF THE INVENTION

The invention relates generally to systems and methods for storing energy during a first time period and retrieving the stored energy during a second time period. More specifically, embodiments of the disclosure are related to systems and methods for using electrical energy to store potential energy during periods of low electrical demand and, thereafter, to convert the stored potential energy into electrical energy that can be supplied to an electrical grid during periods of high electrical demand.

BACKGROUND

The statements in this background section merely provide background information related to the present disclosure and may not constitute prior art.

Affordable and scalable energy storage is seen by many as the missing link between intermittent renewable energy sources, like wind and solar, and 24/7 reliability for electrical grids that rely on these renewable energy sources. Although energy storage systems are crucial to the adoption of renewable energy sources, they also play a critical role in conventional energy carbon-based energy systems. For example, stored energy systems are very very useful in peak shaving and frequency regulation of electrical power grids.

There are many technologies available for energy storage, with a wide variety of technical and economic performance features. Some of the most economical utility scale energy storage solutions are the potential-energy storage systems (PESS) such as pumped hydro and compressed air storage. PESS solutions generally offer significant advantages over storage systems using Lithium ion batteries that store energy in chemical form.

Many PESS systems are able to provide a desirable combination of (i) much higher kW power ratings (i.e., power at which energy can be delivered) and (ii) power delivery for a long duration (up to 10-24 hours, compared to <2 hours for most Li-ion batteries). In addition, PESS systems generally have a significantly lower operating cost of energy storage per kWh (unit of energy). Despite the advantages, however, PESS solutions are not the most popular energy storage solutions because they have very high initial investment costs (>$100 million), long construction times (>10 years), and strict geographical constraints.

SUMMARY OF THE INVENTION

The invention of the present disclosure relates generally to systems and methods for storing potential energy and for converting the stored potential energy to electrical energy or some other form of useful energy. More specifically, the present invention provides systems and methods for using excess or cheap electrical energy during low demand periods to move weights from a first relative position of low potential energy to a second relative position of high potential energy. During time periods of high electrical demand, the system is used to move the individual weight from the relative position of high potential energy to the relative position of low potential energy. As the weight moves from the position of high potential energy, the motion of the weight is used to cause a generator to generate electrical energy. The electrical energy generated by this process is proportional to the difference between the potential energy of the individual weights in the first and second positions of relative potential energy. Some of the embodiments disclosed herein comprise parking areas for storing multiple weights to significantly scale the efficiency of the system while adding only a nominal additional cost.

The details of the system and methods of the present invention will be discussed in conjunction with the figures provided hereinbelow.

BRIEF DESCRIPTION OF THE FIGURES

FIG. 9a is an illustration of the physical components used to implement the embodiment shown in FIG. 8a.

DETAILED DESCRIPTION

Embodiments of the disclosure provide systems and methods for using excess electricity generating during low demand times to store potential energy for that can subsequently be converted to electrical energy for transmission to electrical grids during peak demand times. Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the inventor's specific goals, such as compliance with process technology or design-related constraints, which will vary from one implementation to another. While such a development effort might be complex and time-consuming, it would nevertheless be a routine undertaking for those of skill in the art having the benefit of this disclosure.

The systems and methods disclosed herein are based on the fundamental principle of potential energy. As will be understood by those of skill in the art, if an object of mass M is raised by a height H in the presence of gravitational field g, the energy stored by raising the object is given by:

$$E = MgH \quad \text{(Equation 1)}$$

When the object is subsequently lowered, the stored energy can then be converted into electrical energy by using the motion of the object to operate an electrical generator or other energy generation device. The power output will be a function of rate of descent of the mass and will be given by:

$$P = Mg\frac{dH}{dt} = Mgv \quad \text{(Equation 2)}$$

Where v=dH/dt is the rate of descent. It can provide a constant power P for a duration of:

$$t = H/v \quad \text{(Equation 3)}$$

Example:

If M=5000 tonnes and H=100 m, v=0.69 cm/s (and g=9.8 m/s2). Note that v=0.69 cm/s is chosen to compute 4-hour power rating as 100 m will completely discharge in 4 hours if the weight descends at 0.69 cm/sec. The descent velocity can be changed to match a different power rating if required.

$$E = 5 \times 10^6 \text{ kg} \times 9.8 \text{ m/s}^2 \times 100 \text{ m} = 4.9 \times 10^9 \text{ Joules} = 1360 \text{ kWh}$$

-continued $$t = \frac{100}{0.0069} \text{ sec} = 14400 \text{ sec} = 4 \text{ hr}$$

$$P = 340 \text{ kW power rating for 4 hr}$$

Figure 1A:
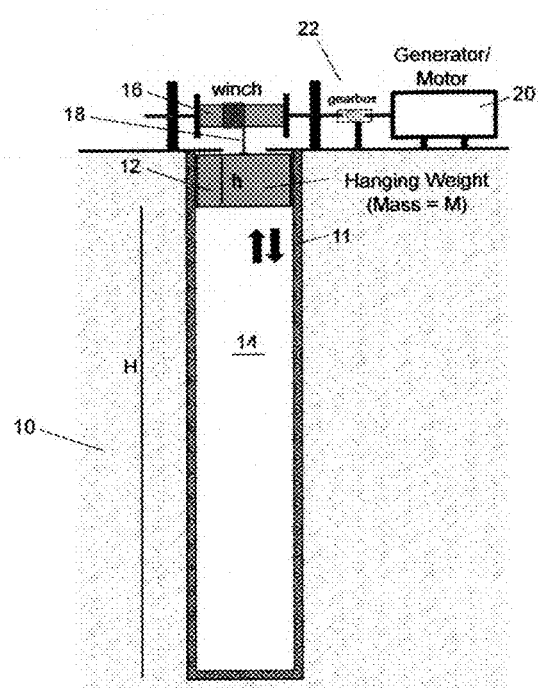
FIG. 1A is an illustration of a gravitational potential energy system in a fully-charged configuration, i.e., the maximum energy state.
Figure 1B:
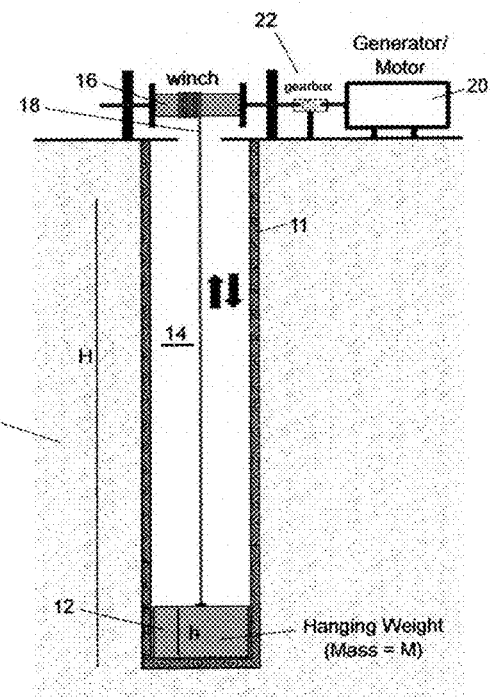
FIG. 1B is an illustration of a gravitational potential energy system in a fully-discharged position, i.e., the minimum energy state.

FIG. 1A is an illustration of a gravitational potential energy system 10 in a fully-charged configuration. When the weight 12 is at the top of shaft 14, it represents a completely charged potential energy system. When the weight 12 is at the bottom of shaft 14, as shown in FIG. 1B, it represents a fully discharged potential energy system. The shaft 14 is lined with a protective liner 11.

In the embodiment shown in FIG. 1A, a winch 16 comprises a cable 18 that is connected to the suspended weight 12. The vertical motion of the weight 12 is converted to a rotatory motion by the winch 16, which is coupled to a generator/motor 20 via a gearbox 22. The gearbox 22 is operable to convert the rotation of the winch shaft to a desired number of rpm from the winch 16 to the generator/motor 20. When the system 10 is charging to move the weight 12 to the fully charged position shown in FIG. 1A, the generator/motor 20 is operating in "motor mode" and is operable to activate the winch 16 to pull the weight 12 upward. When the system 10 is discharging, the generator/motor 20 is operating in "generator mode." As the weight 12 falls, the torque generated by the rotating winch 16 is converted by the generator/motor 20 into alternating current as the weight descends to the bottom of the shaft to the discharged position shown in FIG. 1B.

Figure 2A:
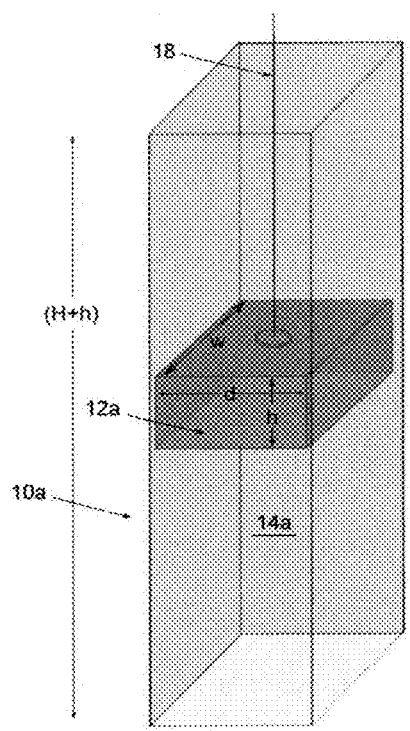
FIG. 2A is an illustration of an embodiment of a gravitational potential energy system having a weight and shaft with a cylindrical cross-sectional configuration
Figure 2B:
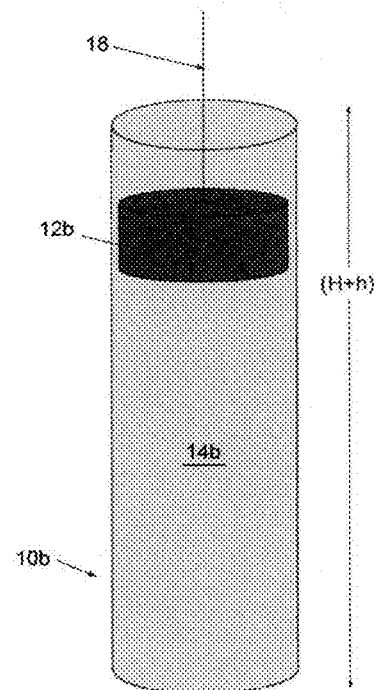
FIG. 2B is an illustration of an embodiment of a gravitational potential energy system comprising a weight having a cuboid configuration and a shaft having a rectangular cross-sectional configuration.

FIG. 2A is an illustration of an alternate embodiment of a gravitational potential energy system 10b having a cylindrical weight 12a suspended in a shaft 14a having a rectangular cross-section configuration. FIG. 2B is an illustration of an embodiment of a gravitational potential energy system 10B comprising a cylindrical weight 12b suspended in shaft 14b having a cylindrical cross-section configuration.

Note that because of the height of the weight (h), the shafts 14 (FIGS. 1A and 1B) and shafts 14a and 14b (FIGS. 2A and 2B) need to be of the height (H+h) to be able to store energy as given by Equation 1: E=MgH.

Figure 3:
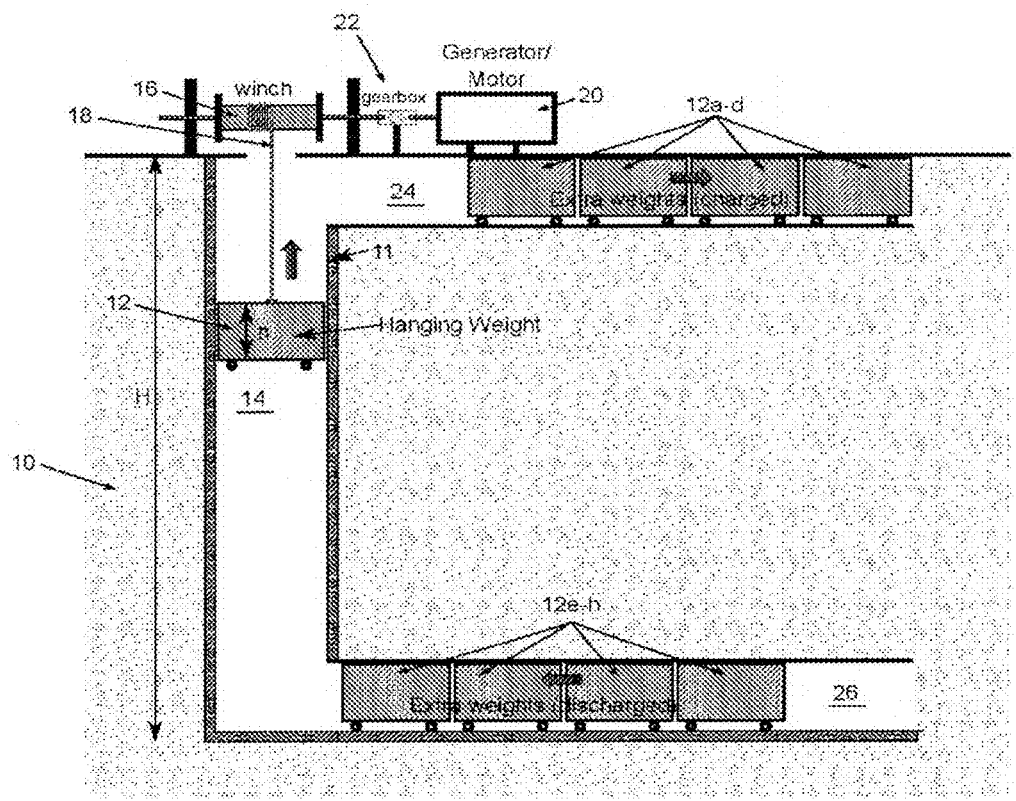
FIG. 3 is a cross-sectional illustration of an embodiment of the gravitational potential energy system with parking spaces for multiple weights at the top and bottom of the shaft.

FIG. 3 is a cross-sectional illustration of an embodiment of the gravitational potential energy system with parking spaces for weights at the top and bottom. This embodiment comprises many of the elements discussed above in connection with FIGS. 1a-1b, including the winch 16 that supports a weight 12 suspended on a cable 18, a generator/motor 20 and a gearbox 22 to couple the generator/motor 20 to the winch 16. In this embodiment, however, a plurality of charged weights 12a-d are stored in parking area at the top of the shaft 14. In addition, a plurality of discharged weights 12e-h are stored in a lower parking space adjacent to the bottom of the shaft 14. This embodiment offers the advantage of allowing multiple weights to use the same shaft for charging and discharging. It also increases the amount of stored potential energy in the system that is available to be provided during times of excess demand for electrical energy.

The embodiment shown in FIG. 3 allows the re-use of the shaft for recharging and discharging multiple weights 12, 12a-h. During any charge or discharge cycle only one of the weights travels through the shaft, while the unused weights stay parked.

To illustrate the advantage of this embodiment, one can consider the improved energy storage capacity from the following analysis of increasing energy storage capacity by 10-fold in this modified multiple-weight embodiment: The fixed costs remain essentially the same. Each weight is identical and, therefore, the cost and complexity of winch 16 and the wire 18 remain unchanged. The only additional cost is the construction and maintenance of the two parking spaces for weights and the cost of additional weights themselves.

As an example, for a parking space comprising N=10 weights, the new energy equation will be:

$$E = MgH \times N \qquad \text{(Equation 4)}$$

This embodiment is significantly more cost effective and much more scalable compared to the baseline embodiment based on a single weight.

Figure 4:
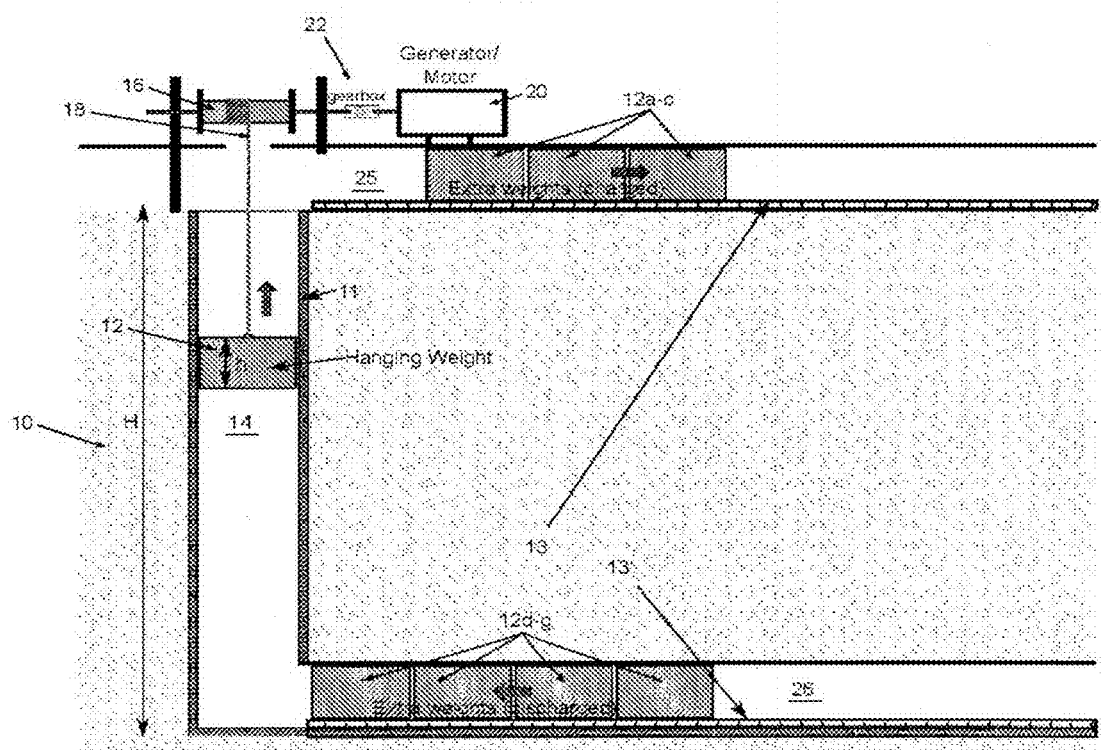
FIG. 4 is a cross-sectional illustration of an embodiment of the gravitational potential energy system of FIG. 3 with the top parking space on top of the ground.

In the embodiment of FIG. 3, the upper parking area is located underground, making the entire facility essentially hidden from view. FIG. 4 illustrates an embodiment of the invention wherein the upper parking area for storing charged weights is above the ground. This embodiment provides a cost advantage because of the construction costs saved by not excavating the location for the upper parking area. FIG. 4 further also shows conveyor belts 13 and 13' for the top and bottom parking spaces respectively.

Figure 3B:
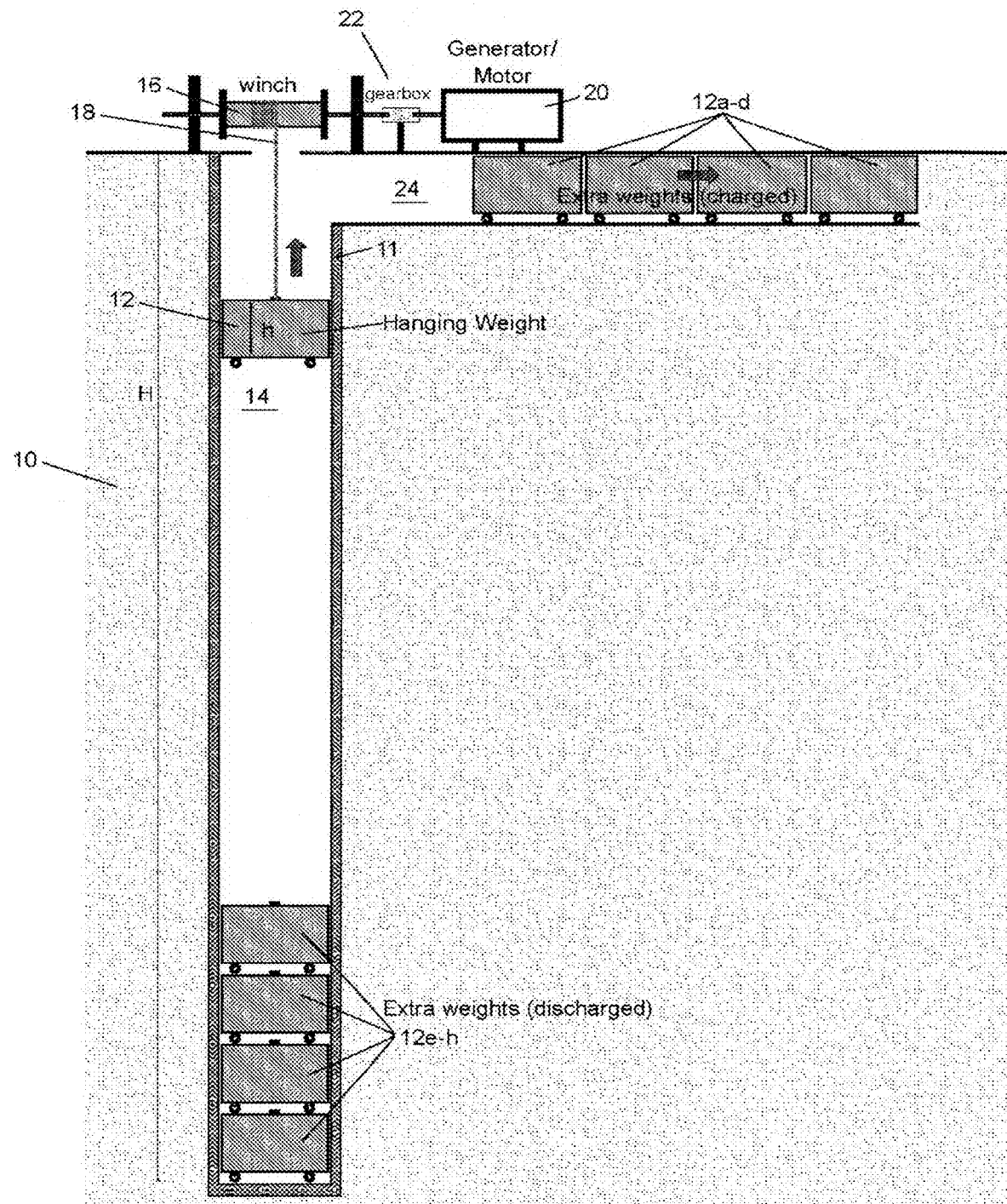
FIG. 3B is an alternate embodiment of the system shown in FIG. 3, wherein a plurality of discharged weights are stored by stacking the weights in the shaft.

FIG. 3B is an illustration of an embodiment having most of the features shown in FIG. 3, but one with a plurality of discharged weights 12 *e-h* that are stored by stacking them in the shaft 14. Like the embodiment in FIG. 3, this embodiment offers the advantage of allowing multiple weights to use the same shaft for charging and discharging. It also increases the amount of stored potential energy in the system that is available to be provided during times of excess demand for electrical energy. One of the advantages of this embodiment compared to the embodiment shown in FIG. 3 is that it does not require a horizontal parking space 26 that may be difficult to construct at a bottom end of shaft 14. Each of the various embodiments described herein may be modified to incorporate the advantages of vertically stacking discharged weights as shown in FIG. 3B.

Figure 5A:
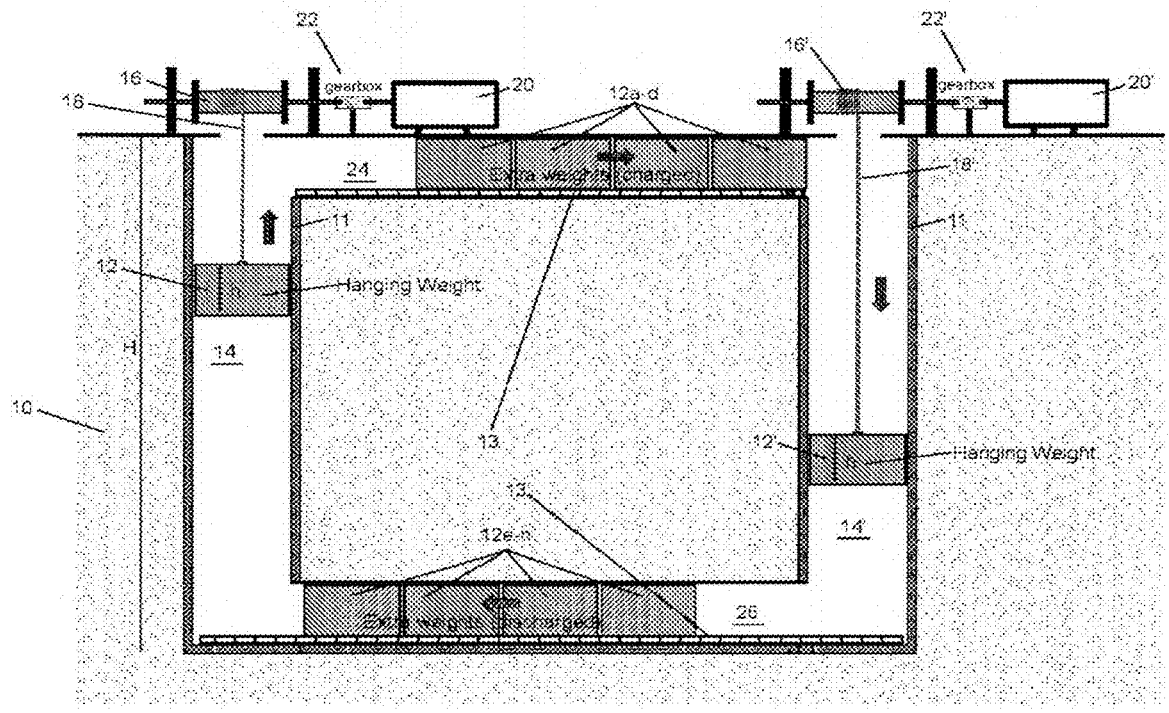
FIG. 5A is a cross-sectional illustration of an embodiment of the gravitational potential energy system with parking spaces for weights at the top and bottom, wherein the weights are circulated in a round-trip configuration.

FIG. 5A is a cross-sectional illustration of an embodiment of the gravitational potential energy system with parking spaces for weights at the top and bottom and wherein the weights are circulated in a round-trip configuration. This embodiment includes all of the functional elements discussed above in the embodiments shown in FIGS. 1A-B, 3 and 4. This embodiment, however, comprises an additional shaft 14', a winch 16' with a wire 18 that is connected to a suspended weight 12'. The generator/motor 20' and the gearbox 22' operate in substantially the way described hereinabove in the discussions of the embodiments shown in FIGS. 1A-B, 3 and 4.

In the embodiment shown in FIG. 5A, the shafts 14 and 14' share the same parking spaces for storage of the fully charged weights (i.e., positioned at a height of a relatively higher parking space) and the fully discharged weights (i.e., positioned at a height of a relatively lower parking space). Operation of the winches 16 and 16' can be coordinated with the operation of the generator/motors 20 and 20' to provide charging and discharging simultaneously in shafts 14 and 14'. Alternatively, the charging and discharging of the weights 12 and 12' in shafts 14 and 14' can be performed independently. Charging can be performed at a variable/different power level in one shaft while power can be delivered at a stable output from the other shaft. If only charging allowed in only one shaft, and only discharging is allowed in the other, it is possible to optimize and simplify the components (e.g., motor-only and generator-only used instead of motor/generator component). If both are configured for charging/discharging, by allowing both to discharge (or charge) at the same time, it enables twice the power rating for output (or input). There may be a power gap (as later shown in FIG. 13B) when a single shaft is used. This power gap can be minimized if the shafts are allowed to discharge with an overlap of the cycles.

Figure 5B:
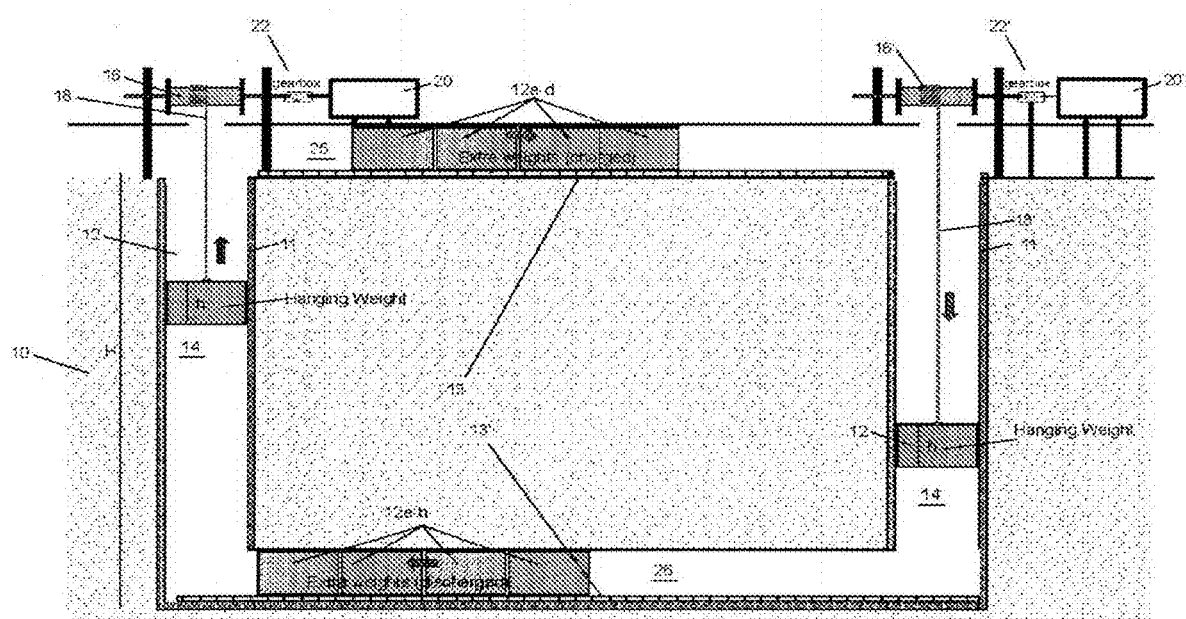
FIG. 5B is a cross-sectional illustration of the embodiment of FIG. 5A with the top parking space on top of the ground.

In the embodiment shown in FIG. 5A, the upper parking space is underground. FIG. 5B is a cross-sectional illustration of the embodiment of FIG. 5A with the parking space above the ground. These respective embodiments have the advantages described above in the discussion of FIGS. 3-4.

Figure 6:
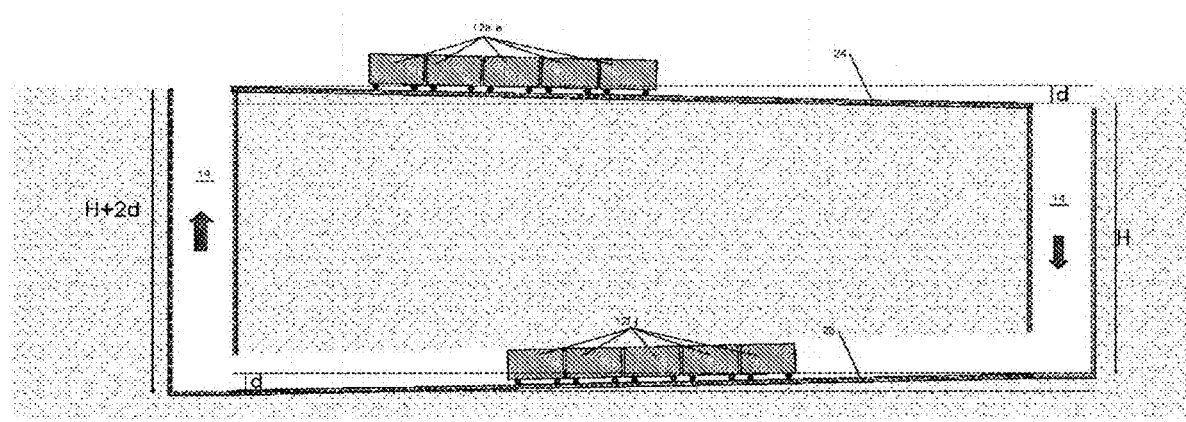
FIG. 6 is a cross-sectional illustration of an embodiment of the gravitational potential energy system wherein the upper and lower parking spaces are configured with inclined surfaces to facilitate movement of the weights.

FIG. 6 is a cross-sectional illustration of an embodiment of the gravitational potential energy system wherein the upper and lower parking spaces are configured with inclined surfaces to facilitate movement of the weights. This embodiment includes all of the functional elements discussed above in connection with the embodiments in FIGS. 1A-B, 3, 4, 5A-B. In this embodiment, the upper and lower parking spaces comprise inclined surfaces 24 and 26. The inclines of the surfaces 24 and 26 are defined by a vertical drop in height of "d", although the heights do not necessarily need to be the same for both. For an equivalent energy storage system that raises weights to height H, this system must now raise the weights to an increased height=H+2d. In alternate embodiments of this configuration, the one of the surfaces 24 or 26 may be inclined while the other surface is not inclined.

In various configurations of this embodiment, the inclined surfaces 24 and 26 can use conveyor belts and the weights 12*a-e* and 12*f-j* can be "dropped" onto the respective belt. The weight will be transported along the inclined ramp in response to the gravitational force related to vertical component of the angle of the inclined surface. Alternatively, the weights 12*a-d* and 12*f-h* can be configured with wheels on their lower surfaces to allow the weights to roll down the respective inclined surfaces. In various embodiments, the wheels may be motorized to facilitate the movement down the respective ramps. In the embodiment comprising weights with wheels, the incline surfaces may be configured with rails to guide the weights down the respective ramps.

Figure 7:
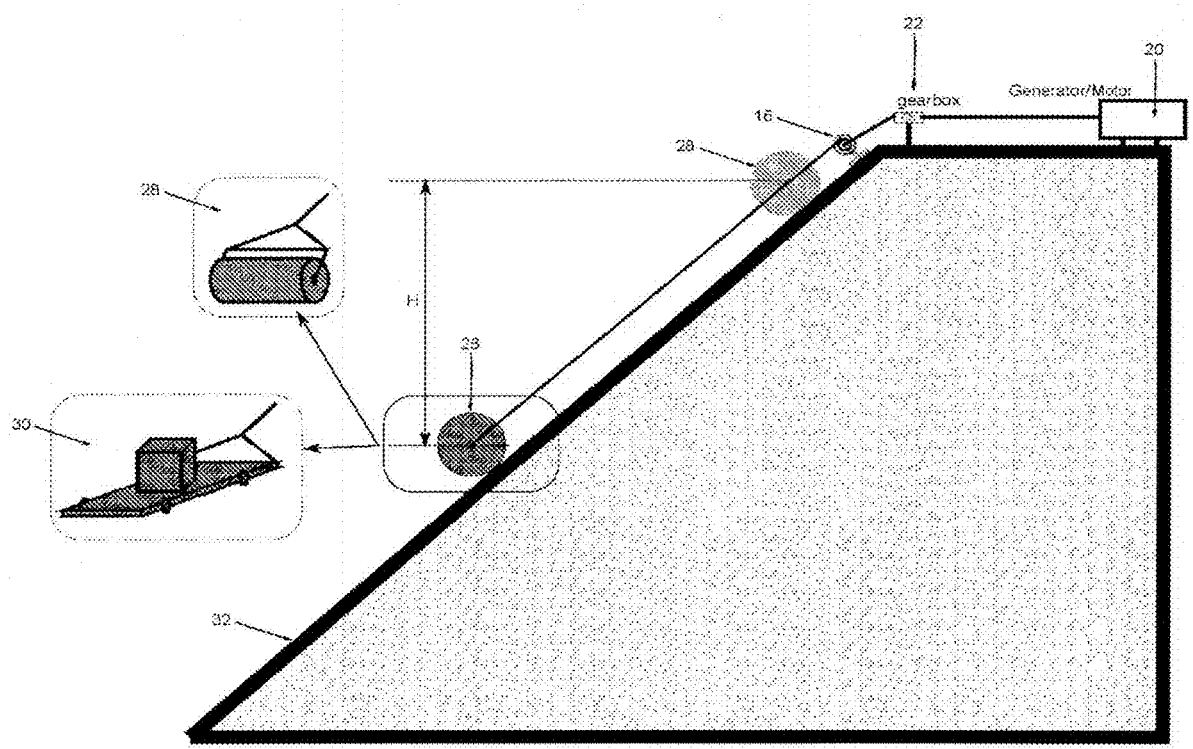
FIG. 7 is an illustration of an alternate embodiment of the gravitational potential energy system wherein the weight comprises either a cylindrical body or a weight carried on a rolling platform on an inclined plane.

Instead of digging a shaft, the features of the various embodiments can be implemented using an inclined plane 32, as shown in FIG. 7. In this embodiment, the weight comprises either a cylindrical body 28 or a weight carried 30 on a rolling platform. This embodiment also includes all of the functional elements discussed above in connection with the embodiments in FIGS. 1A-B, 3 and 4. This embodiment may reduce construction costs and can be used to implement the teachings of the present disclosure on naturally occurring geologic structures such as canyons or mountains. Instead of the weights moving up and down vertically in a shaft, the weights now move up and down on an incline. All the features in the embodiments discussed above, including multiple weights and parking spaces may be implemented in this embodiment.

Figure 8A:
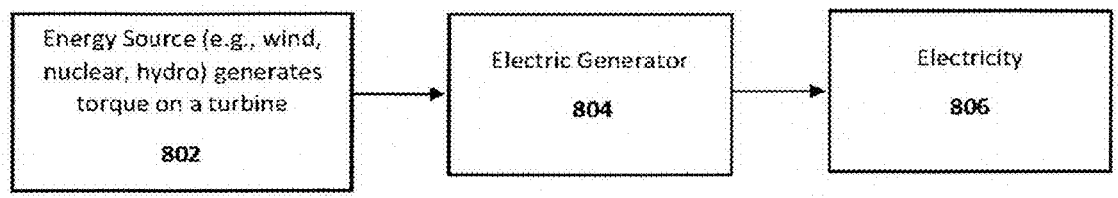
FIG. 8a is a generalized block diagram showing an embodiment of the disclosure wherein an energy source, such as a wind turbine, is used to generate torque to operate an electrical generator to generate electricity.

Typically, energy generation sources convert some form of energy (wind energy, nuclear energy, hydro energy, etc.) into torque on a rotating shaft. The rotating shaft (through an optional gear box to modify rotational speed) drives an electric generator to generate electricity. In some embodiments of the present disclosure, potential energy is stored by raising a weight using a motor that is powered by electricity. This system is illustrated generally in FIG. 8A. In step 802 an energy source (e.g., wind, nuclear, or hydro) is used to generate torque on a turbine of an electric generator. In step 804, the turbine of the electric generator rotates and the rotation is converted to electricity in step 806.

Figure 8B:
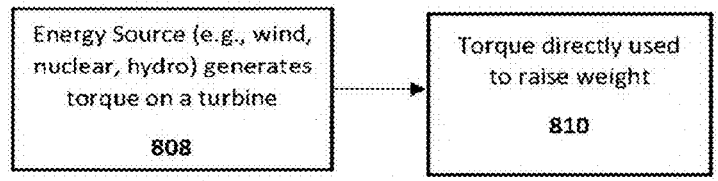
FIG. 8b is an alternate embodiment of the present disclosure wherein an energy source, such as a wind turbine, is used to directly generate torque that is used by a winch to raise a weight to an elevated position thereby directly storing potential energy.

FIG. 8B is block diagram illustration of the direct torque conversion alternate embodiment of the present disclosure. In step 808, an energy source (e.g., wind, nuclear, or hydro) is used to generate torque on a shaft. In step 810, the torque on the shaft is used directly to raise a weight to generate potential energy.

Figure 9A:
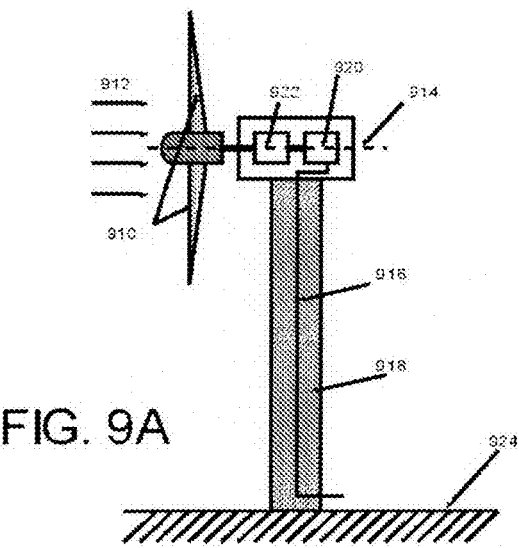
Figure 9B:
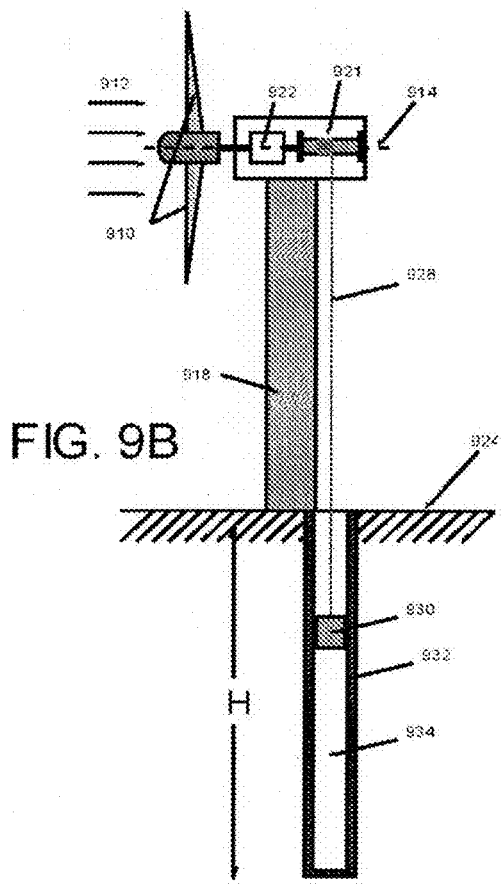
FIG. 9b is an illustration of the physical components used to implement the embodiment shown in FIG. 8b.

FIGS. 9A and 9B illustrate embodiments of physical components for implementing the energy conversion processes discussed above in connection with FIGS. 8A and 8B. As shown in FIG. 9A, rotor blades 910 turn in response to wind 912 thereby turning a shaft on horizontal axis 914. The shaft is coupled to a gearbox 922 that is further coupled to generator 920. Electricity generated by the generator 920 can be transferred to an electrical grid by cables 916. The system components are supported by a tower 918. The components for storing potential energy may be above or below ground level 924.

FIG. 9B is an illustration of components for implementing the direct conversion method discussed above in connection with FIG. 8B. The system shown in FIG. 9B, however, does not have a gearbox nor a generator. Instead, the torque produced by rotation of the rotor blades is used to turn a winch 921 connected to a cable 928 that is operable to raise a weight 930 by a distance H in shaft 934 to generate potential energy for subsequent conversion to electricity.

Figure 10:
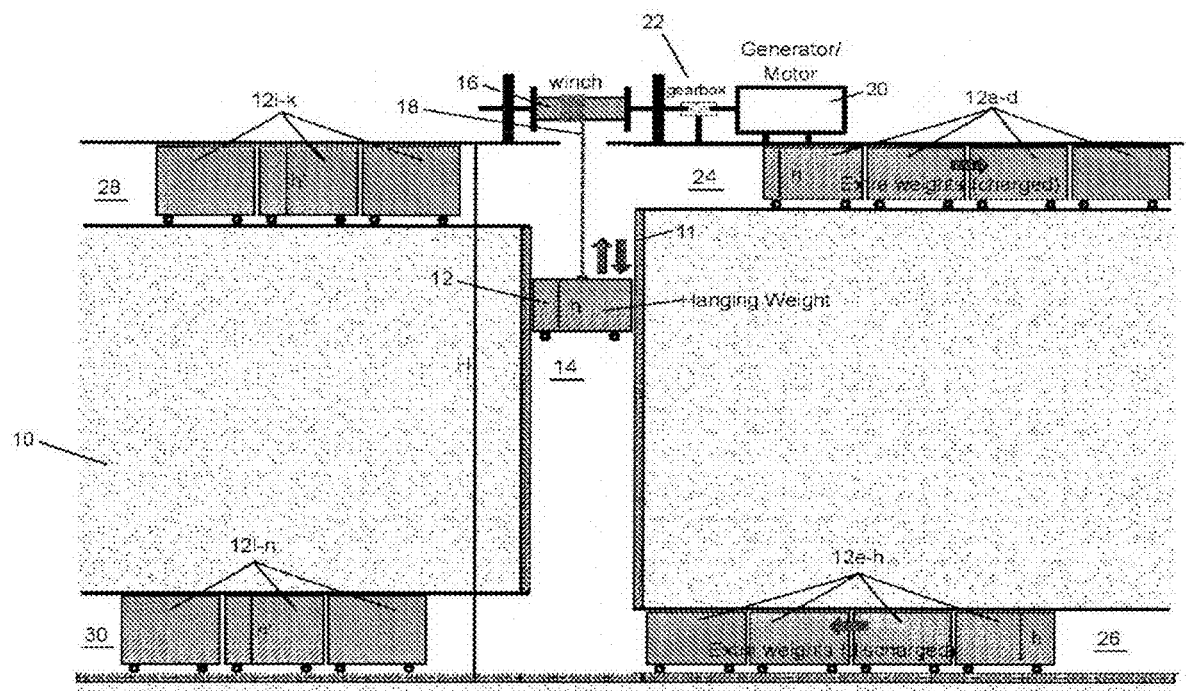
FIG. 10 is an alternate embodiment of the system shown in FIG. 3 comprising the gravitational potential energy system wherein the weights reside in two parking places.
Figure 11:
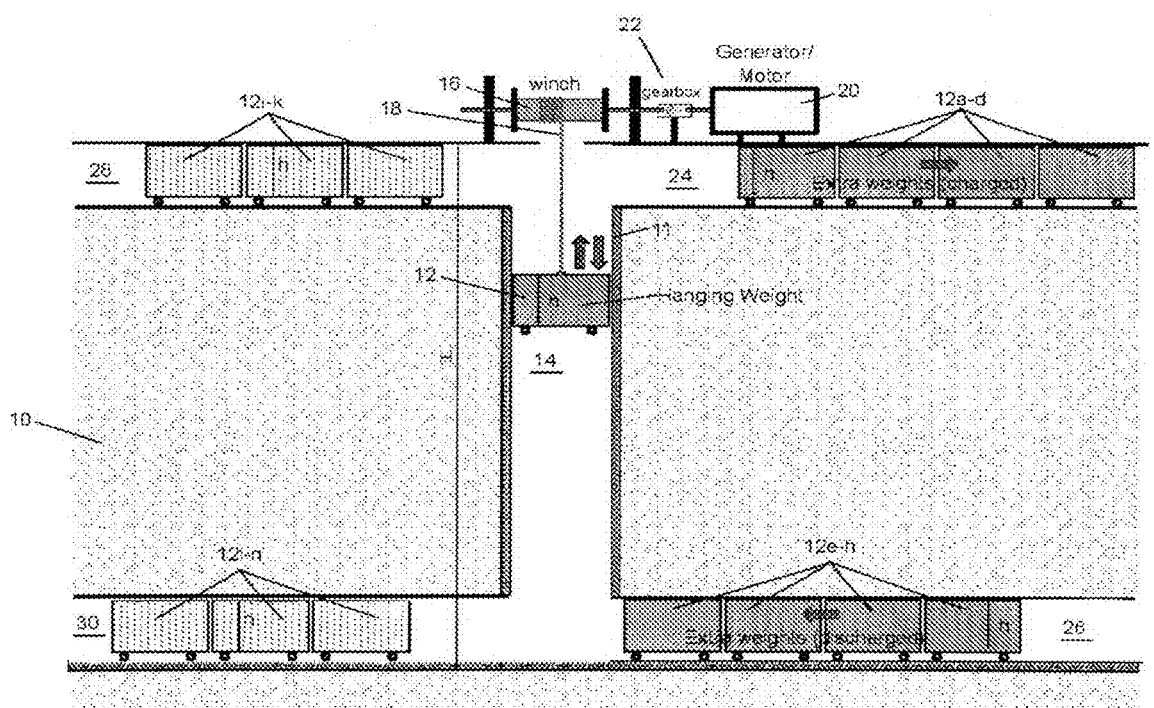
FIG. 11 is a further modification of the embodiment in FIG. 3, wherein weights from different parking spaces have different characteristics, such as height, weight, shape, ad/or density.

FIG. 10 and FIG. 11 show alternate embodiments of the energy storage systems discussed above in connection with FIG. 3. Instead of a single linear parking space (24, 26) as shown in FIG. 3, however, the embodiment shown in FIG. 10 and FIG. 11 comprises an additional parking space shown by reference numerals 28 and 30. The masses of the weights in each of the parking spaces 24, 26 and 28, 30 are different. In an embodiment shown in FIG. 10, parking space 28, 30 is shown to have weights 12$i$-$k$ at the top and weights 12$l$-$n$ at the bottom. The difference in weight can be achieved by one or more of the following methods:
1) Change in density of the material;
2) Change in volume of the weight, which in turn can be achieved through one or more of the following:
   a. Change in height of the weight (h vs. h' as shown in FIG. 10)
   b. Change in radius of the weight
   c. Change in shape of the weight The different weights can be useful in several scenarios, including one in which a higher power rating is tailored to meet demand at a specific time. As discussed above, the power of the generation is given by M*g*V. For example, a case where V (velocity of descent of weight) has a range of Vmin–Vmax, then the power rating range is M*g*Vmin–M*g*Vmax. For an embodiment with two (or multiple weights in multiple parking areas as shown in FIG. 11), and in general the range of weights is Mmin–Mmax, then the power rating range increases from Mmin*g*Vmin to Mmax*g*Vmax.

The embodiment of FIG. 10 and FIG. 11 can be adapted to incorporate the features shown in FIG. 4 wherein the parking space is on top of the ground. The embodiment of FIG. 10 and FIG. 11 may also be modified to incorporate the features shown in FIG. 3B where the weights are stacked vertically at the bottom of the shaft and the parking spaces at the top of the shaft are horizontal, as described in FIG. 10 and FIG. 11.

FIGS. 12A-F illustrate alternate embodiments for configurations of top and bottom parking spaces. These parking shape variants could be dictated by the constraint of limiting the footprint of the parking spaces, or the cost of tunneling in a particular manner.

Figure 12A:
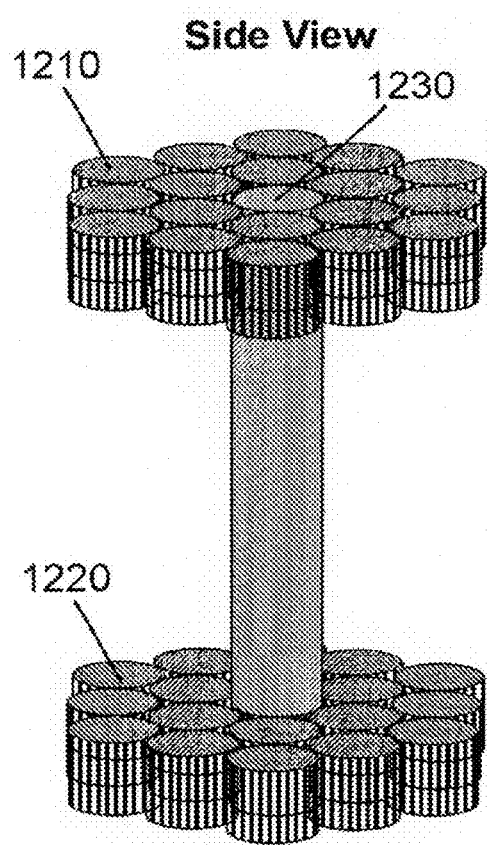
FIGS. 12A-H illustrate various alternate configurations for the top and bottom parking spaces in various alternate embodiments of the potential energy storage system of the present disclosure.
Figure 12B:
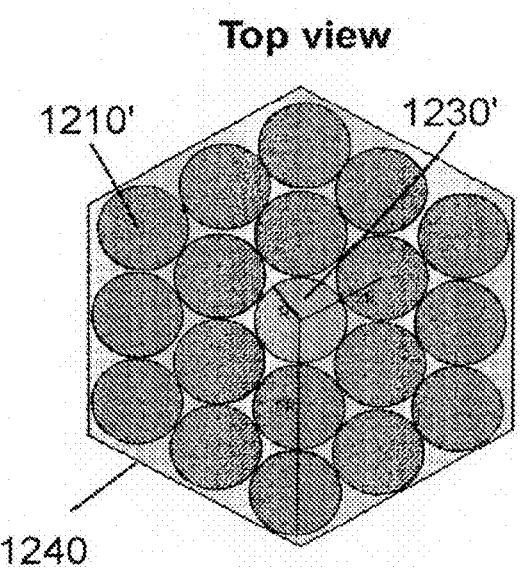

FIGS. 12A-B are side view and top view of parking spaces. 1210 is one of the many parking slots for weights in the top parking space. Similarly, 1220 is one of the many parking slots for weights in the bottom parking space. 1230 is the vertical shaft. 1210' and 1230' are top views of 1210 and 1230 respectively. The shape of the parking space is hexagonal (top down view), is shown as 1240 and can result in compact storage of weights in the parking space.

Figure 12C:
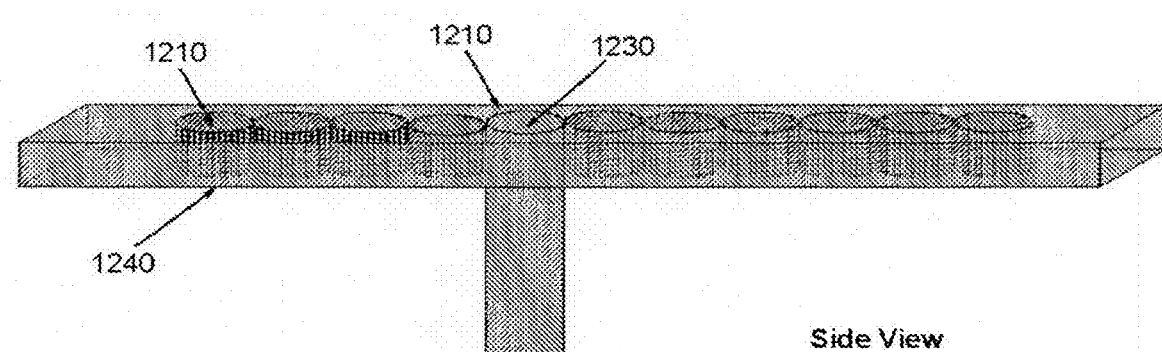
Figure 12D:
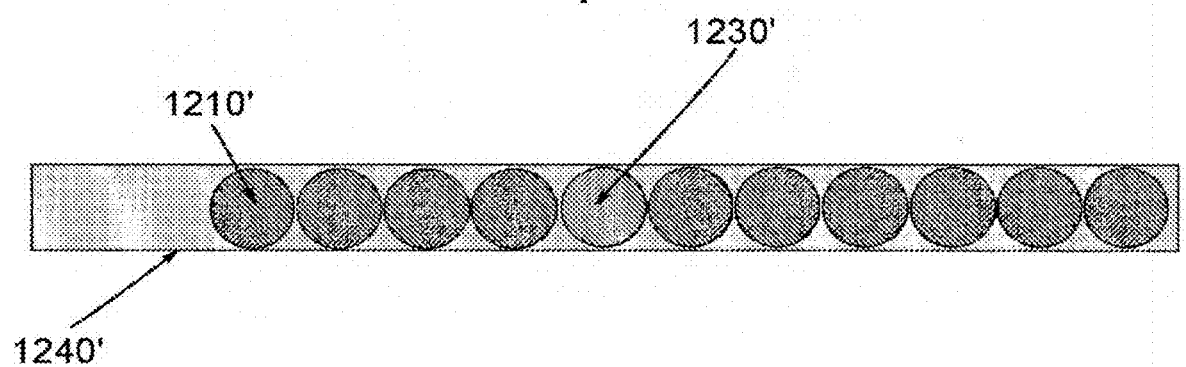

FIG. 12C-D are side view and top view of a rectangular shaped (top down view) parking space. Further, the parking space is made of parking tracks (1240 at the top and 1250 at the bottom).

Figure 12E:
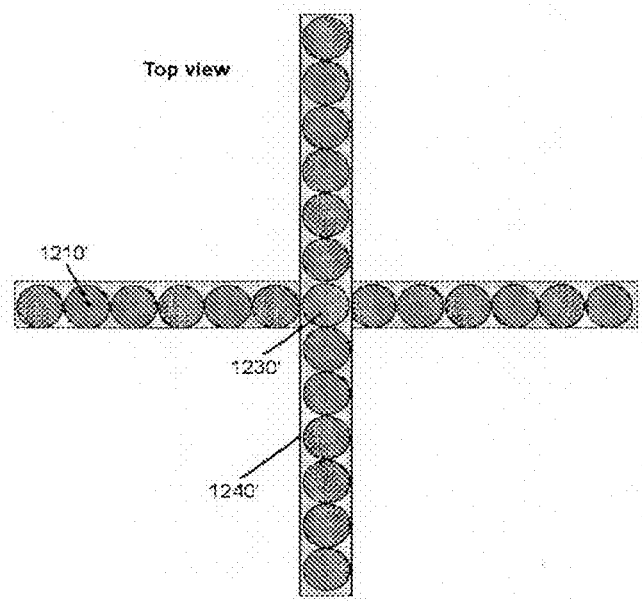
Figure 12F:
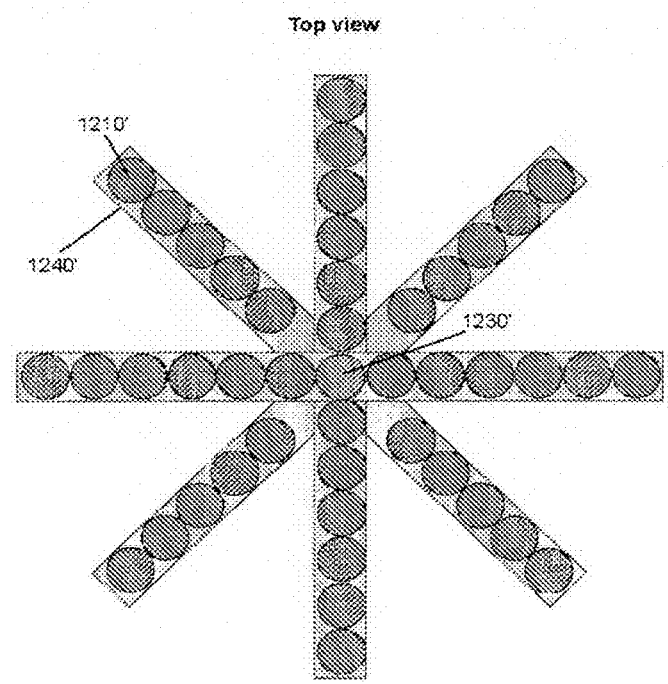

In the embodiment shown in FIGS. 12E-F, the weights 1210' are stored in a plurality of rows 1210' that are spaced in a radial pattern around the central shaft 1230'. The embodiment shown in FIG. 12E shows four rows 1240' spaced around shaft 1230' in a radial pattern with 90 degrees spacing between the rows. The embodiment in FIG. 12F shows eight rows 1240' spaced around shaft 1230' in a radial pattern with 45 degrees spacing between the rows.

Figure 12G:
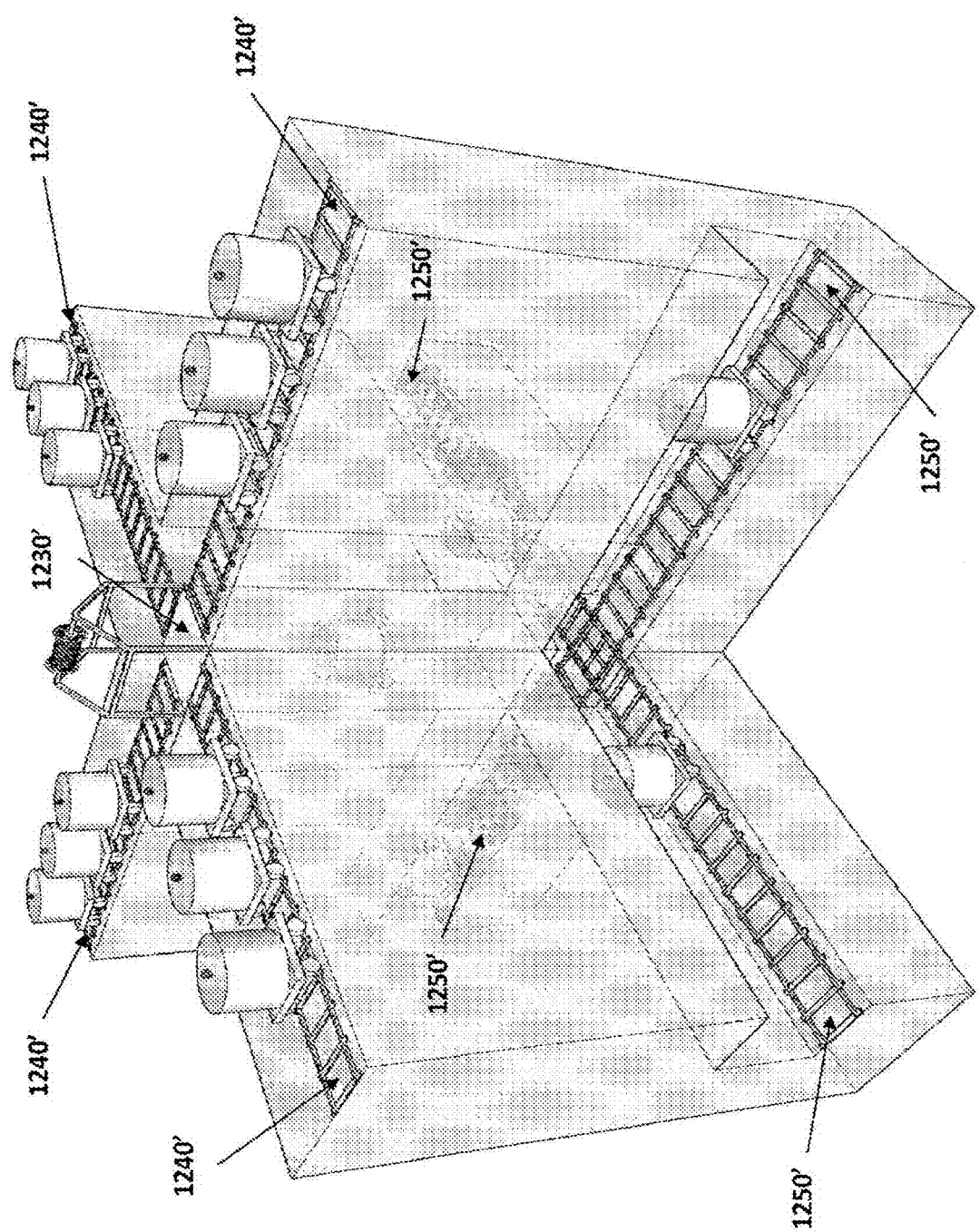
Figure 12H:
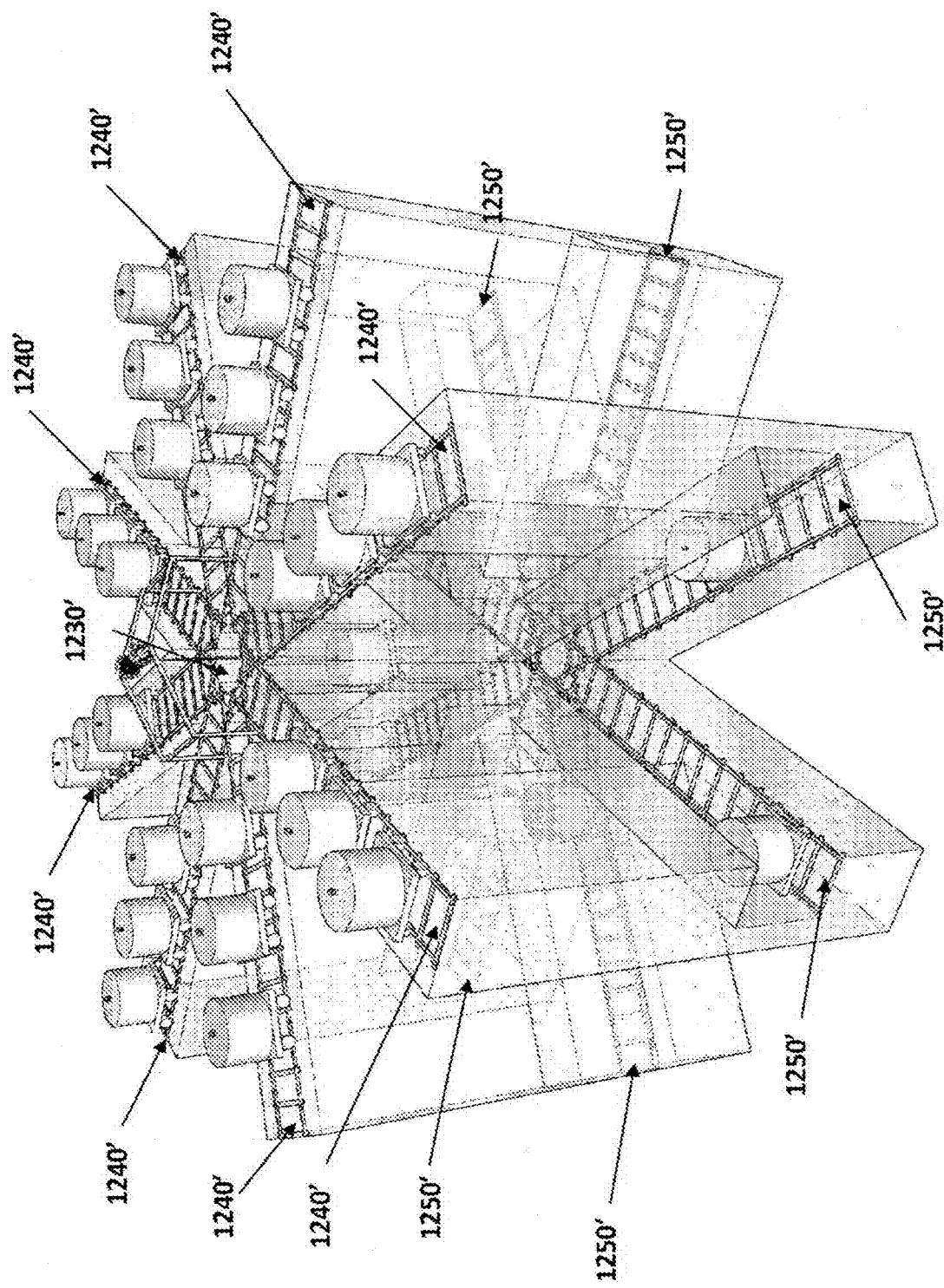

FIGS. 12G-H are perspective views of the configurations shown in FIGS. 12E-F, respectively. These figures also show a plurality of lower storage rows 1250' corresponding to the upper storage rows 1240'

The embodiment of FIG. 12A-H can be adapted to incorporate the features shown in FIG. 4 wherein the parking space is on top of the ground. The embodiment of FIG. 12A-H may also be modified to incorporate the features shown in FIG. 3B where the weights are stacked vertically at the bottom of the shaft and the parking spaces at the top of the shaft are horizontal, as described in FIG. 12A-H.

Figure 13A:
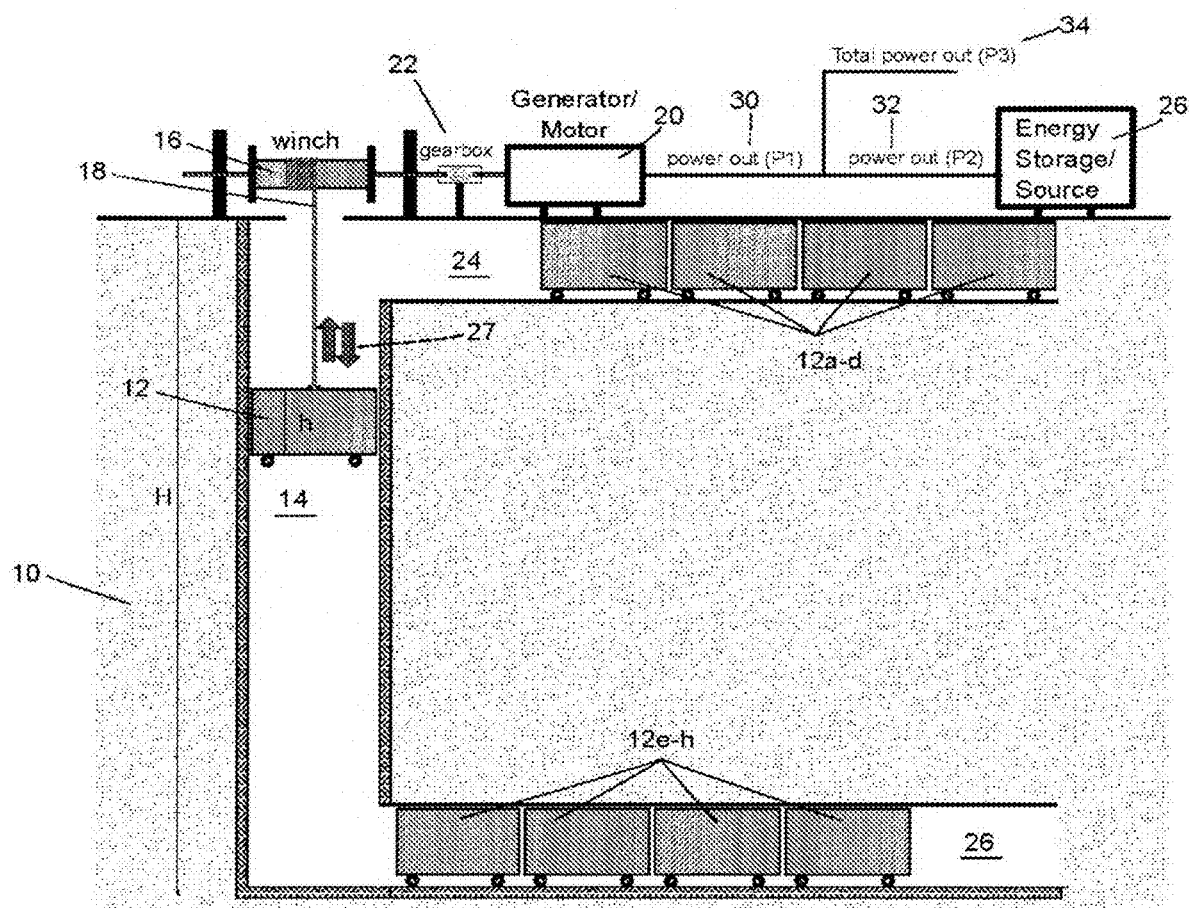
FIG. 13A is an illustration of an embodiment of the disclosure wherein power output from the motor/generator of a gravity-based storage system is combined with the power output from another energy storage system to provide a smoother power profile.

FIG. 13A is an illustration of an embodiment having most of the features shown in FIG. 3 but where its power output P1 30 from the motor/generator 20 is coupled with the power output P2 32 from 26, which could be another energy storage or an energy generation source system. The total power P3 34 as a result of coupling of P1 and P2, has output characteristics that are more desirable such as a smoother power profile over time. Those of skill in the art will understand that when 26 represents an energy storage system, it may be charged through any source including the same source that charges the gravity-based storage embodiment through the motor/generator 20. Further, 26 could represent any storage system including another gravity-based storage system.

Figure 13B:
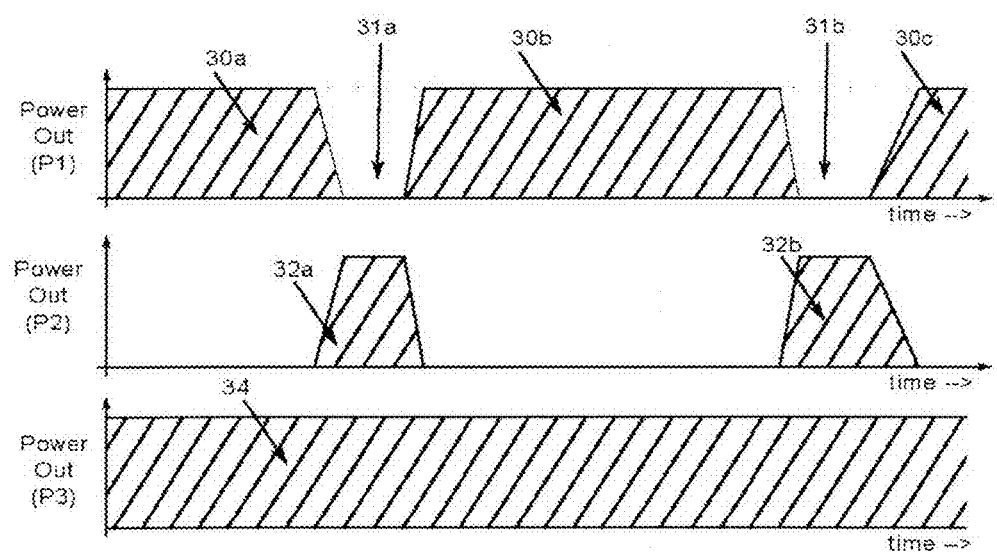
FIG. 13B is an illustration of power output profile of the system shown in FIG. 13A.

A waveform example of such a power coupling is shown in FIG. 13B. Power P1 is composed of power durations as represented by 30$a$, 30$b$, and 30$c$. Each of these power outputs could be due to a descent of a weight (e.g., 12 in FIG. 12). As the weight descents with a near constant speed, the power output is nearly constant. Before achieving the constant speed, and towards the end of the descent to the bottom, the weight will have lower speed, which will result in a ramp-up and ramp-down of power as represented by each of 30$a$-$c$. Between the duration when one weight is completely discharged to the lower parking space (e.g., weight 12$e$ in 26 in FIG. 13A) and another weight from the higher parking space (e.g., weight 12$a$ in 24 in FIG. 13A) is about to be start discharging, there will be a gap in the power output (e.g., 31$a$-$b$). As can be seen in FIG. 13B, power output P2 from the energy storage/source 26 is controlled to provide power outputs 32$a$ and 32$b$ at time intervals when P1 has breaks in power output or reductions in power output, such that the total power P3 has a smoother power profile over time.

The embodiment of FIG. 13A can be adapted to incorporate the features shown in FIG. 4 wherein the parking space is on top of the ground. The embodiment of FIG. 13A may also be modified to incorporate the features shown in FIG. 3B where the weights are stacked vertically at the bottom of the shaft.

The present disclosure is not necessarily limited to the example embodiments embodiment described herein. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A potential energy storage system, comprising:
   a plurality of shafts having a cross-section configured to receive a weight having a complementary cross-section, each of said shafts further comprising:
   a winch having a cable operably coupled thereto;
   a weight suspended from said cable at a first predetermined height in a shaft, said first predetermined height corresponding to a first predetermined potential energy;
   a generator/motor operably coupled to said winch by a gearbox;
   wherein:
      said generator/motor is operable to activate said winch to rotate when said motor/generator is operating in motor mode, wherein said rotation of said winch raises said weight from said first height to a second height in said shaft, said second height corresponding to a second predetermined potential energy; and
      said generator/motor is operable to couple with said winch as it rotates when said motor/generator is operating in generator mode, wherein said rotation of said winch lowers said weight to said first predetermined height in said shaft;
      wherein rotation of said winch and said generator/motor while lowering said weight from said second height to said first height causes said generator/motor to generate a quantity of electrical energy that corresponds to the difference in height of said weight between said first and second heights;
   a first weight storage area at said first height, said first storage area being proximate to and extending between two shafts in said plurality of shafts, said first storage area being configured to store a plurality of said discharged weights at said first height; and
   a second weight storage area at said second height, said second storage area being proximate to and extending between said two shafts in said plurality of shafts, said second storage area being configured to store a plurality of said charged weights at said second height;
   means for transporting discharged weights within said first storage area between said two shafts in said plurality of shafts; and
   means for transporting charged weights within said second storage area between said two shafts in said plurality of shafts.

2. The potential energy storage system of claim 1 wherein said weight is releasably secured to said cable and can be attached to, or detached from, said cable at a storage location corresponding to said first height or said second height.

3. The potential energy storage system of claim 1, wherein a storage area comprise inclined surfaces.

4. The potential energy storage system of claim 3, wherein a storage area further comprise rails between said two shaft and wherein said weights comprise wheels that are configured to roll on said rails using gravitational force to transport said weights between said two shafts.

5. The potential energy storage system of claim 3 wherein said inclined surface further comprise conveyor belts.

6. The potential energy system of claim 1, wherein said gearbox is operable to change the rate of raising or lowering said weight to adjust the rate of electrical energy consumption when said generator/motor is operating in motor mode or the rate of electrical energy generation when said generator/motor is operating in said generator mode.

7. The potential energy storage system of claim 1, wherein said two shafts comprise a rectangular cross-section and wherein said weights comprise a complementary cuboid configuration.

8. The potential energy storage system of claim 1, wherein said two shafts comprise a circular cross-section and wherein said weights comprise a complementary cylindrical configuration.

9. A potential energy storage system, comprising:
   a winch having a cable operably coupled thereto;
   a weight suspended from said cable at a first predetermined height in a shaft, said first predetermined height corresponding to a first predetermined potential energy;
   a generator/motor operably coupled to said winch by a gearbox;
   wherein:
      said generator/motor is operable to activate said winch to rotate when said motor/generator is operating in motor mode, wherein said rotation of said winch raises said weight from said first height to a second height in said shaft, said second height corresponding to a second predetermined potential energy; and
      said generator/motor is operable to couple with said winch as it rotates when said motor/generator is operating in generator mode, wherein said rotation of said winch lowers said weight to said first predetermined height in said shaft;
      wherein rotation of said winch and said generator/motor while lowering said weight from said second height to said first height causes said generator/motor to generate a quantity of electrical energy that corresponds to the difference in height of said weight between said first and second heights;
   further comprising a plurality of first weight storage areas in a spaced radial pattern proximate to said shaft at said first height, said storage areas being configured to store a plurality of discharged weights at said first height; and
   further comprising a plurality of second weight storage areas in a spaced radial pattern proximate to said shaft at said second height, said second weight storage areas being configured to store a plurality of charged weights at said second height.

10. The potential energy storage system of claim 9, wherein said weight is releasably secured to said cable and can be attached to, or detached from, said cable at a storage location corresponding to said first height or said second height.

11. The potential energy system of claim 9, wherein said gearbox is operable to change the rate of raising or lowering said weight to adjust the rate of electrical energy consumption when said generator/motor is operating in motor mode or the rate of electrical energy generation when said generator/motor is operating in said generator mode.

* * * * *